United States Patent [19]
Yamamoto

[11] Patent Number: 5,860,887
[45] Date of Patent: Jan. 19, 1999

[54] REDUCTION GEAR APPARATUS

[75] Inventor: Haruhisa Yamamoto, Fujisawa, Japan

[73] Assignee: Canon Kabushiki Kaisha, Tokyo, Japan

[21] Appl. No.: 774,880

[22] Filed: Dec. 27, 1996

[30] Foreign Application Priority Data

Jan. 11, 1996 [JP] Japan .................................. 8-003063

[51] Int. Cl.⁶ .................................................... F16H 1/00
[52] U.S. Cl. ........................................... 475/163; 475/175
[58] Field of Search ..................... 475/163, 175

[56] References Cited

U.S. PATENT DOCUMENTS

| | | | |
|---|---|---|---|
| 1,616,369 | 2/1927 | Hartmann ................. | 475/163 |
| 2,785,590 | 3/1957 | Sundt ..................... | 475/163 |
| 2,919,587 | 1/1960 | Sundt ..................... | 475/163 |
| 3,935,750 | 2/1976 | Maroth .................... | 74/61 |
| 5,029,991 | 7/1991 | Kohno et al. ............. | 350/429 |

FOREIGN PATENT DOCUMENTS

| | | |
|---|---|---|
| 0 719 959 | 7/1996 | European Pat. Off. . |
| 61-160650 | 7/1986 | Japan . |
| 63-180754 | 7/1988 | Japan . |
| 2 011 016 | 7/1979 | United Kingdom . |

*Primary Examiner*—Dirk Wright
*Attorney, Agent, or Firm*—Fitzpatrick, Cella, Harper & Scinto

[57] ABSTRACT

There is disclosed a reduction gear apparatus including a first member, a second member connected to the output shaft, a press member that rotates together with the input shaft to press part of the second member so as to bring the part into contact with the first member, and a control member for controlling rotation of the first member about the output shaft. A high speed reducing ratio can be obtained with respect to rotation of a motor, and a clutch function for connecting/disconnecting power transmission to/from the output shaft by controlling rotation of the first member and other functions can be imparted to the gear reduction apparatus.

6 Claims, 10 Drawing Sheets

REDUCTION GEAR APPARATUS

BACKGROUND OF THE INVENTION

1. Field of the Invention

The present invention relates to a reduction gear apparatus capable of obtaining a high speed reducing ratio in a single stage, a drive apparatus using this reduction gear apparatus, and an optical system such as a photographic lens for driving (e.g., zooming) a lens using this drive apparatus or a camera on which this photographic lens is mounted.

2. Related Background Art

A photographic lens is constituted by a plurality of lens groups and performs adjustment such as focusing or zooming of the lens by moving these lens groups in the optical axis direction. In particular, in the photographic lens mounted on a camera, the lens groups are moved by turning an operation ring mounted on the outer surface of the lens. A photographer selects a mode using a powered/manual selection knob upon judging the photographic situation or performs powered or manual driving of the operation ring.

Powered driving is performed by a drive unit mounted in a lens barrel. The drive unit incorporates various switches, a drive motor, a power transmission mechanism, and the like.

Powered driving of the lens is performed by operating a switch lever arranged on the drive unit. Manual driving is performed by directly operating the operation ring with a hand.

In a mechanism for transmitting rotation from such a drive source to the load side, a torque limiter is generally arranged in a transmission system to cause slippage so as not to adversely affect the drive source when a large force acts on the load side or from the load side.

The torque limiter mechanism is arranged in the power transmission unit. In particular, in driving a lens to an operation end at high speed, the torque limiter mechanism has an effect to absorb an impact force acting on tooth flanks when the lens is stopped. A clutch mechanism for performing powered or manual driving is also arranged. FIGS. 18 and 19 show a photographic lens, and particularly, a zoom power transmission mechanism.

FIG. 18 shows a power transmission route in powered driving of a lens, and FIG. 19 shows a case wherein an operation ring is manually driven.

Referring to FIG. 18, members except for a lens barrel and the operation lens are incorporated in a drive unit.

Referring to FIGS. 18 and 19, a lens operation ring 55 has meshing teeth 55a on its circumferential surface. A stepped sleeve 58 is mounted on an output shaft 57 extending from the case of a reduction gear apparatus 56 formed integrally with a motor 66. The sleeve 58 is fixed to the output shaft 57 by, e.g., a pin 59, so that the sleeve 58 rotates together with the output shaft 57.

An output gear 60 of the reduction gear apparatus 56 is rotatably mounted on the sleeve 58 and normally biased against the motor 66 side by a spring 62 through a slide washer 61. This structure serves as a torque limiter in which the output gear 60 of the reduction gear apparatus 56 and the output shaft 57 of the reduction gear apparatus 56 rotate together but slip with respect to the sleeve 58 of the reduction gear apparatus 56, thereby reducing the force acting on the teeth and hence preventing damage to the teeth.

This torque limiter mechanism enhances the effect of absorbing the impact force acting on the tooth flanks particularly when the lens is driven to the operation end at high speed and stopped.

An intermediate gear 63 is interposed between the output gear 60 of the reduction gear apparatus 56 and the operation ring 55. The intermediate gear 63 is rotatable with respect to a shaft 64, and at the same time slidable along the shaft 64. Meshing teeth 63a formed on the outer circumferential surface of the intermediate gear 63 mesh with the output gear 60 of the reduction gear apparatus 56 and the operation ring 55. Using this power transmission mechanism, when the photographer operates a predetermined switch arranged on the drive unit, a rotation power generated by the motor 66 is transmitted to the operation ring 55 through the output gear 60 of the reduction gear apparatus 56 and the intermediate gear 63, thereby performing powered driving of the lens.

FIG. 19 shows the case in which the operation ring is manually driven. In this case, when the photographer operates a clutch lever (not shown), a clutch plate 65 is rotated. A selection pin 66 extending on the clutch plate 65 engages with the intermediate gear 63, and the intermediate gear 63 slides along the shaft 64 during the operation of the clutch lever. The intermediate gear 63 then disengages from the output gear 60 of the reduction gear apparatus 56. In manually driving the lens, the selection lever is operated as described to cut off the power transmission path from the drive motor. The lens is driven by directly manually operating the operation ring or operating a lever attached to the operation ring.

In selectively switching between powered driving and manual driving, meshing teeth must be generally formed on the outer circumferential surface, as can be represented by a spur gear in a system wherein the intermediate gear interposed between the output gear 60 of the reduction gear apparatus 56 and the operation ring 55 to mesh therewith is displaced to engage or disengage the meshing teeth.

The power transmission member for transmitting power through gear meshing and the torque limiter member for limiting the transmission torque in overloaded rotation to prevent damage to the tooth flanks are independently arranged as separate members in the power transmission mechanism for coupling the motor to the operation ring of the lens.

The following problems are posed in the above reduction gear apparatus.

In the clutch mechanism, one shaft and a gear train are added between the driving side and the driven side, and an extra space for these members is required. In addition, a clearance must be assured between the clutch gear and the shaft to allow rotation or sliding of the clutch gear. This increases the backlash together with the addition of the gear train.

On the other hand, in the torque limiter mechanism, since the sleeve is attached to the distal end of the rotating shaft of the motor serving as a drive source through a straight pin or a spring pin, the motor gear is prone to run out depending on conditions such as the fitting length of the motor gear with the shaft and the backlash of the pin. In addition, the area of the frictional surface cannot be sufficiently assured depending on the relationship between the shaft and the gear. Due to an increase in the biasing force of a friction spring, an unnecessary force acts to make the friction torque unstable. This also results in a spatial disadvantage.

When a lens or the like is to be driven using such a drive apparatus, the lens cannot be stably driven.

SUMMARY OF THE INVENTION

It is the first object of the present invention to provide a reduction gear apparatus which can obtain, in a single stage, a high speed reducing ratio with a transmission efficiency close to that of a spur gear, obtain stable rotation of the output shaft without any backlash at the start time, has a simple structure and an excellent durability, can be manufactured at low cost, and has rotation control means (e.g., a clutch mechanism and a torque limiter mechanism) for controlling the rotation of the output shaft.

It is the second object of the present invention to provide a drive apparatus using a reduction gear apparatus which has solved the above problems.

It is the third object of the present invention to provide an optical system such as a photographic lens or a camera which has solved the above problems.

Note that a reference related to the present application is U.S. application Ser. No. 08/576,901.

According to the characteristic features of the present invention, there is provided a reduction gear apparatus comprising a first member supported by a casing, a second member coupled to an output shaft, pressing means adapted to rotate together with an input shaft to press part of the second member against the first member, thereby causing the part of the second member to contact or mesh with the first member, and rotation control means for controlling rotation of the output shaft, wherein a relative offset of a contact or meshing position of the second member from the first member is transmitted to the output shaft as an output.

BRIEF DESCRIPTION OF THE DRAWINGS

FIGS. 3A and 3B show a modification of the structure in FIG. 1, in which FIG. 3A is a perspective view of a press mechanism, and FIG. 3B is an exploded perspective view of a joint mechanism;

DETAILED DESCRIPTION OF THE PREFERRED EMBODIMENTS (Basic Structure)

Figure 1:
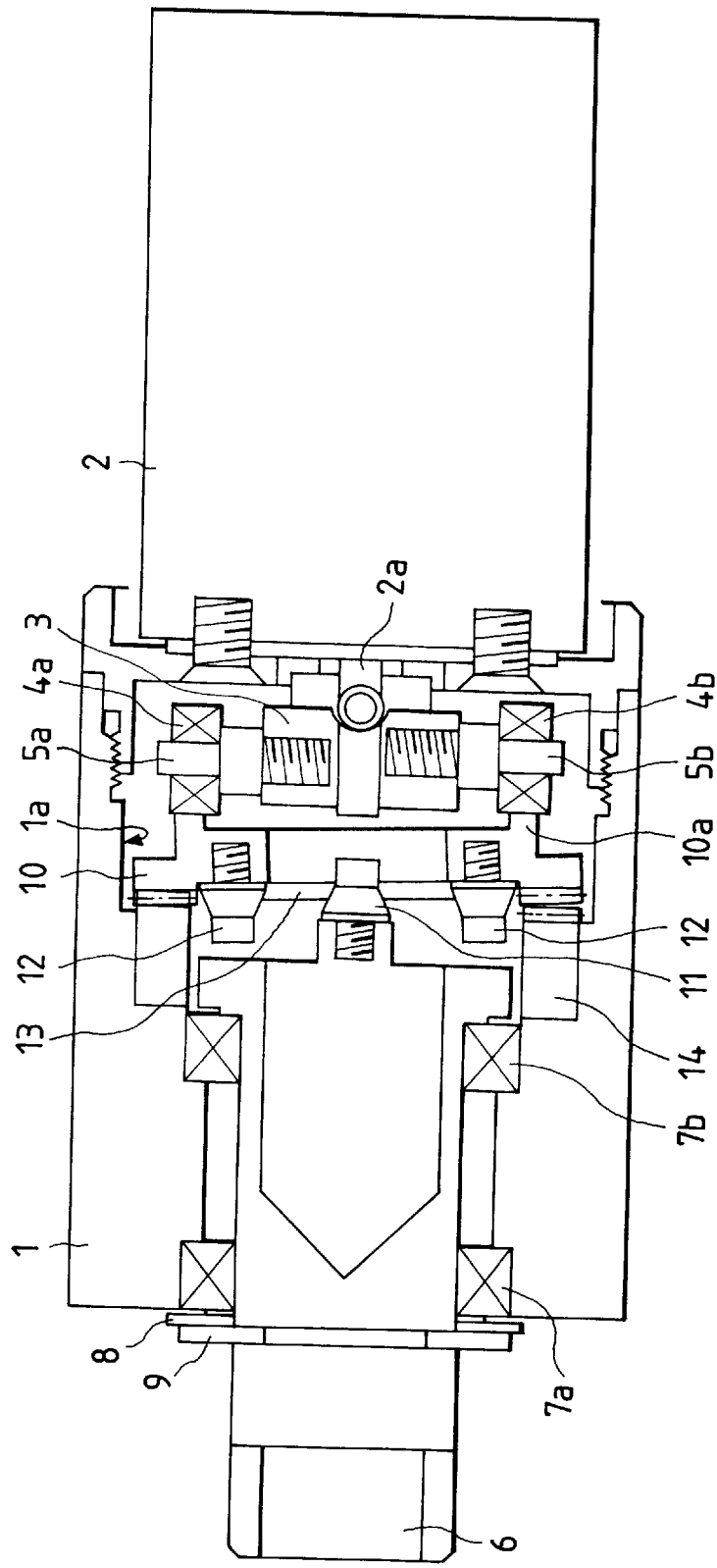
FIG. 1 is a sectional view showing the basic structure of a reduction gear apparatus according to the present invention.

FIG. 1 shows the basic structure of a reduction gear apparatus according to the present invention.

One end of a casing 1 of the reduction gear apparatus is screwed to a motor 2, and the distal end portion of an output shaft 6 extends from the other end of the casing 1. The output shaft 6 is rotatably supported by a first radial bearing 7a and a second radial bearing 7b in the casing 1. A first gear 14 is disposed in the casing 1 such that the teeth of the first gear 14 face the motor 2. The first gear 14 is fixed or rotatably mounted with respect to the casing 1.

The output shaft 6 and the first gear 14 are mounted such that their axes match the axis of a rotating shaft 2a of the motor 2. A regulation portion 1a formed on an inner wall surface to limit the eccentricity amount produced upon switching and rotation of a second gear 10 (to be described later) is coaxially formed in the same manner as described above. Note that removal of the output shaft 6 is prevented by a stop E ring 9 mounted on a projecting end portion side through a backlash adjustment spacer 8.

The rotating shaft (input shaft) 2a of the motor 2 is inserted into the casing 1, and a rotor 3 is screwed and fixed to the distal end portion of the rotating shaft 2a. Note that the rotor 3 may be fixed to the rotating shaft 2a by press fit, adhesion, or the like. First and second support shafts 5a and 5b are fixed in the radial direction of the rotor 3 which is perpendicular to the rotating shaft 2a.

The first and second support shafts 5a and 5b form a straight line in the radial direction, but are shifted from each other by a distance d in the axial direction (thrust direction). First and second press rollers 4a and 4b constituted by radial bearings having the same diameter are rotatably mounted at the distal end portions of the first and second support shafts 5a and 5b, respectively. The rotor 3, the press rollers 4a and 4b, and the support shafts 5a and 5b constitute a press mechanism (to be described later) for pressing part of the second gear 10 against the first gear 14. Note that the above shift allows rotation balance adjustment so as to prevent the press mechanism from unbalanced rotation.

This shift amount or distance d is so set as to match an inclination required to mesh part of the second gear 10 with the teeth of the first gear 14. More specifically, the first press roller 4a is located closer to the second gear 10 side than the second press roller 4b. For this reason, the second gear 10 is inclined with respect to the rotating shaft 2a while the first press roller 4a contacts the second press roller 4b. Note that the shift amount d may be set zero, and the difference between the diameters of the first and second press rollers 4a and 4b may serve as the shift amount d.

The second gear 10 has a ring-like projection 10a having an inclined surface with which the press rollers 4a and 4b are brought into contact at the back side which is opposite to the press rollers 4a and 4b. The projection 10a guarantees good contact between the inclined second gear 10 and the press rollers 4a and 4b.

Figure 2:
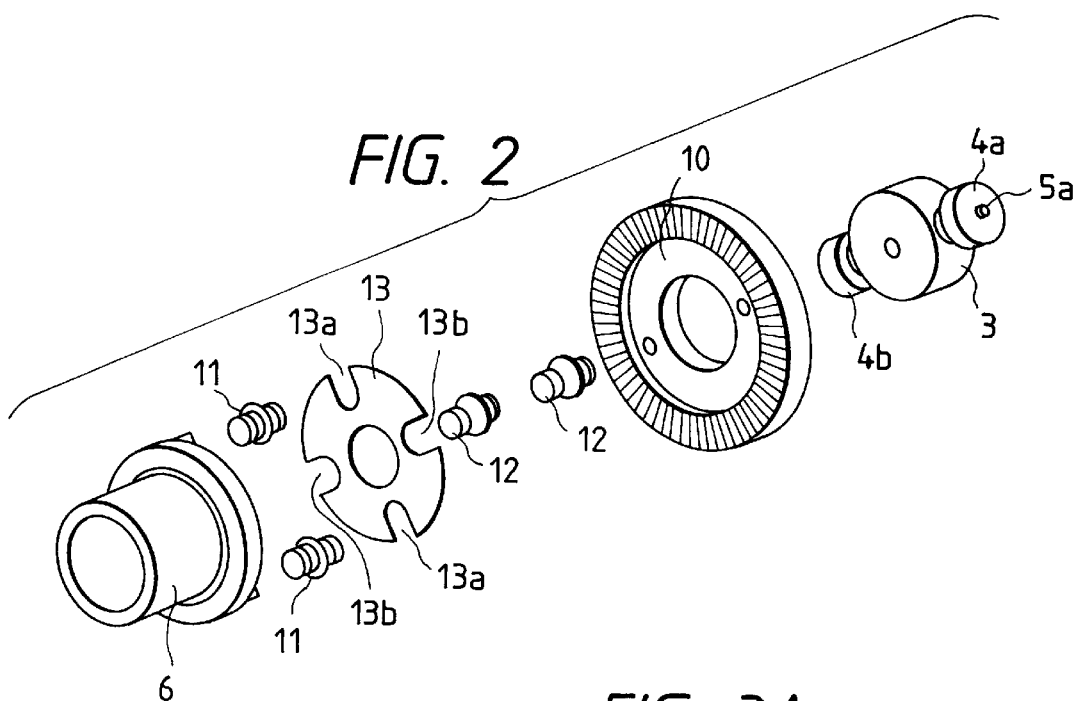
FIG. 2 is an exploded perspective view of FIG. 1.

As shown in FIG. 2, the second gear 10 has radial bevel gear teeth or triangular bevel teeth (the number of teeth: n1) on one side of an annular gear body. The second gear 10 is made of an appropriate material such as a metal or synthetic resin.

The second gear 10 is mounted on the output shaft 6 through a joint mechanism having an aligning function. This joint mechanism is designed to transmit rotation of the second gear 10 which swings and rotates to the output shaft 6. In this embodiment, the joint mechanism is constituted by a circular plate-like transmission member 13 having spring properties, and a pair of first connecting pins 11 and a pair of second connecting pins 12 which are swingably and rotatably connected to the transmission member 13. U-shaped holes 13a and 13b are formed in the peripheral portion of the transmission member 13 at an equal angular interval of 90°. The first connecting pins 11 engage with the pair of opposing U-shaped holes 13a, and the second connecting pins 12 engage with the pair of opposing U-shaped holes 13b. The engaging portions of the first and second connecting pins 11 and 12 which engage with the U-shaped holes are tapered. The transmission member 13 can swing without any backlash at the U-shaped holes due to the action of the tapered surfaces of the engaging portions.

The pair of first connecting pins 11 constituting the joint mechanism are fixed to the second gear 10, while the pair of second connecting pins 12 are fixed to the output shaft 6. The tapered portions of the pairs of connecting pins press the front and rear surfaces of the transmission member 13 to elastically deform the transmission member 13. Any backlash of the output shaft between the connecting pins and the U-shaped holes in the rotational direction can therefore be eliminated. Even if the second gear 10 rotates while it is swinging, the inclination caused by this swinging is absorbed by the inclination upon switching the transmission member 13. The rotation of the second gear 10 is transmitted to the output shaft 6 through the first and second connecting pins 11 and 12 due to the rotational rigidity of the transmission member 13. Note that the transmission member 13 has U-shaped holes engaged with the tapered portions of the connecting pins 11 and 12, but may have elongated holes.

The first gear 14 has gear teeth whose number (n2) is different from the number of teeth of the second gear 10. The second gear 10 partially meshes with the first gear 14.

In the above structure, when the rotating shaft 2a of the motor rotates, the press mechanism constituted by the press rollers 4a and 4b also rotates together with the rotating shaft 2a. The press rollers 4a and 4b press the ring-like projection 10a of the second gear 10 forward. The first press roller 4a is located closer to the second gear 10 side than the second gear 10. For this reason, the second gear 10 swings about the axis of the output shaft 6, and the gear portion pressed by the press roller 4a meshes with the gear portion of the first gear 14. At this time, the second press roller 4b also abuts against the projection of the second gear 10, so that run-out of the second gear 10 is suppressed, thereby attaining noise-free, vibration-free rotation.

In this embodiment, since the first gear 14 is fixed with respect to the casing 1, the meshing position shifts with rotation of the first press roller 4a. In this case, decentering and inclination during swinging can be absorbed by elastic deformation of the transmission member 13 of the joint mechanism, and an aligning operation effected by the tapered surfaces of the collars of the connecting pins 11 and 12. Therefore, accurate swinging and rotation of the second gear 10 are warranted, rotation is accurately transmitted to the output shaft 6, and any backlash produced can be absorbed.

Assume that the number n1 of teeth of the second gear 10 and the number n2 of teeth of the first gear 14 are 51 and 50, respectively. In this case, when the second gear 10 swings and rotates once, the meshing amount increases by one tooth because the difference between n1 and n2 is 1. More specifically, when the motor shaft 2a rotates once, the second gear 10 rotates 1/50. In the above arrangement, the tapered portions are formed on the connecting pins 11 and 12. However, the connecting pins may be made straight, and tapered engaging portions may be formed in the elongated or U-shaped holes of the transmission member 13.

When the first gear 14 is free to rotate with respect to the casing 1, the first gear 14 follows swinging of the second gear 10 and rotates to absorb the difference in the number of teeth. In this case, the second gear 10 repeats only a swinging motion, and does not rotate about its axis.

When the first gear 14 is fixed to or free to move with respect to the casing 1, a clutch mechanism for controlling connection/disconnection to/from the output shaft 6 can be arranged.

The first gear 14 can be rotated to change the speed reducing ratio, i.e., increase it.

The first gear 14 is frictionally held in the casing 1 to provide a function as a torque limiter. It is also possible to add the clutch mechanism to this toque limiter.

Figure 3A:
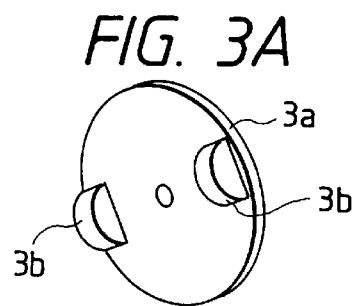

In this basic structure, press rollers constituted by radial bearings are used as the press means of the press mechanism. However, rollers made of a resin material or the like may be used. As shown in FIG. 3A, a pair of semicylindrical projections 3b may be formed on a rotary disk 3a. Alternatively, semispherical projections may be formed. Preferably, these projections have a small friction coefficient and are made of a material excellent in wear resistance.

Figure 3B:
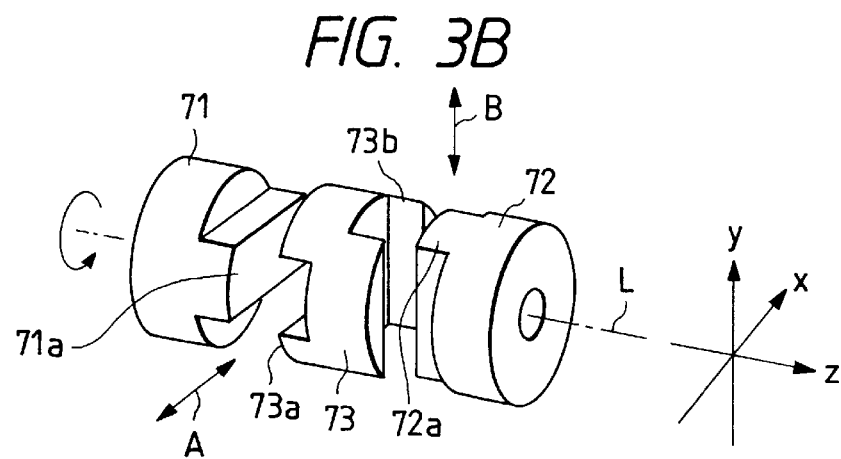

The joint mechanism may be constituted by a rotary swivel slider mechanism, as shown in FIG. 3B.

This rotary swivel slider mechanism is constituted by an input hub 71 fixed to the second gear 10, an output hub 72 fixed to the output shaft 6, and a spacer 73 engaged with the input and output hubs 71 and 72. I-shaped first and second projections 71a and 72a extend on the opposing surfaces of the input and output hubs 71 and 72 in directions perpendicular to a rotation axis L. The disk-like spacer 73 has first and second engaging grooves 73a and 73b on opposing surfaces of the spacer 73 back to back to be perpendicular to the rotation axis L and to each other. The first projection 71a of the input hub 71 engages with the first engaging groove 73a, and the second projection 72a of the output hub 72 engages with the second engaging groove 73b.

In the joint mechanism having this structure, the input hub 71 and the spacer 73 slip relative to each other in directions indicated by a double-headed arrow A, and the spacer 73 and the output hub 72 slip relative to each other in directions indicated by a double-headed arrow B. The input hub 71 is allowed to swing about the x- and y-axes although the input hub 71 is fixed to the second gear 10. Rotation of the second gear 10 is stably transmitted to the output shaft 6.

Especially, when the second gear 10 rotates at high speed in a high-speed reduction gear apparatus, the tooth profiles of the second and first gears 10 and 14 are determined such that the swing angle is set small when quiet rotation is required, and the top diameter of, e.g., a standard gear is set to about 1/3 the difference between the top diameter and the pitch diameter. Although not particularly illustrated, in mounting the output shaft 6 in the casing 1, the gap between the radial bearings 7a and 7b is preferably increased to minimize vibrations caused by switching of the second gear 10. For example, the bearing 7a is mounted in the casing 1, and the bearing 7b is mounted outside the reduction gear apparatus, and a transmission means such as a gear is arranged between the bearings to extract the output from the transmission means.

(First Modification of Basic Structure)

Figure 4:
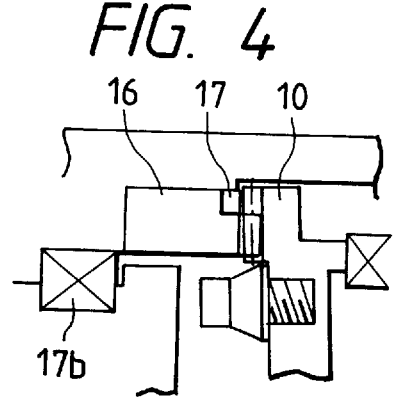
FIG. 4 is a sectional view showing another modification of the structure in FIG. 1.

FIG. 4 shows the first modification of the basic structure.

In this structure, an elastic member 17 made of rubber or polyurethane is fixed by baking or using an adhesive to part of the tooth portion of the first gear 16 meshed with the second gear 10. An elastic member made of rubber or polyurethane may be fixed to part of the second gear 10.

In this structure, when the press mechanism causes the second gear 10 to mesh with a first gear 16, the teeth of the second gear 10 meshes with the teeth of the first gear 16, and at the same time the second gear 10 contacts the abutment portion of the elastic member 17, thereby elastically deforming the elastic member 17. The elastic member can absorb the backlash between the two gears and reduce vibrations and noise. Note that the gear abutment surface of the elastic member 17 is preferably formed into an almost bevel gear tooth profile, a triangular gear tooth profile, or a spur gear tooth profile.

(Second Modification of Basic Structure)

Figure 5:
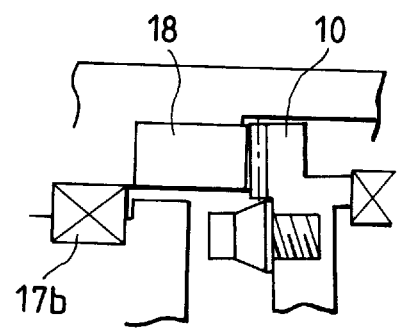
FIG. 5 is a sectional view showing still another modification of the structure in FIG. 1.

FIG. 5 shows the second modification of the basic structure.

In this structure, either the first gear or the second gear uses an elastic member of rubber, polyurethane, or the like. In FIG. 5, a first gear 18 is made of an elastic member.

In this modification, when the press mechanism (identical to the press mechanism of the first embodiment in FIG. 1) causes the second gear 10 to mesh with the first gear 18, the backlash between both the gears can be absorbed, and vibrations and noise can be reduced. Note that the second gear may use an elastic member. The abutment surface of the elastic gear preferably has an almost bevel gear tooth profile, a triangular gear tooth profile, or a spur gear tooth profile.

(Third Modification of Basic Structure)

Figure 6:
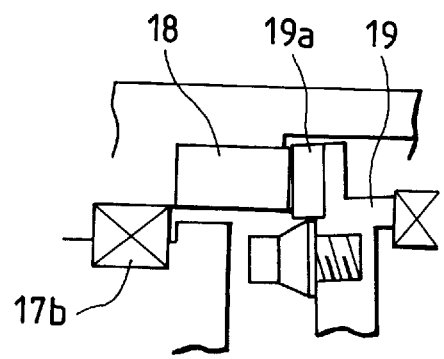
FIG. 6 is a sectional view showing still another modification of the structure in FIG. 1.

FIG. 6 shows the third modification of the basic structure.

In this structure, a first gear 18 uses an elastic member, and a tooth portion 19a of a second gear uses an elastic member made of rubber, polyurethane, or the like. The tooth portion 19a is fixed to a switching member 19 by baking or adhesion.

In this structure, when the press mechanism (identical to the press mechanism of the first embodiment in FIG. 1) causes the second gear 10 to mesh with the first gear 18, the backlash between the two gears can be absorbed, and vibrations and noise can be reduced. Not that the second gear may use an elastic member. The abutment surface of the elastic gear preferably has an almost bevel gear tooth profile, a triangular gear tooth profile, or simply a spur gear tooth profile.

(First Embodiment)

Figure 7:
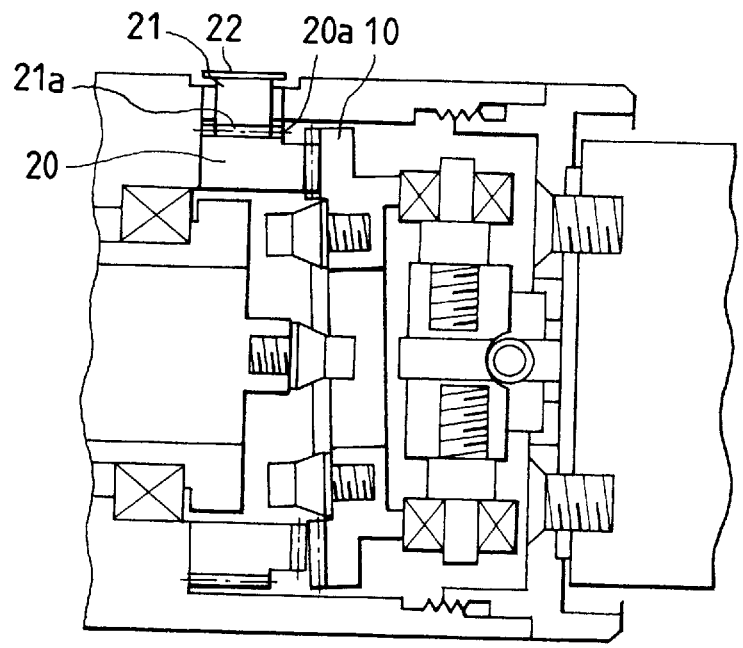
FIG. 7 is a sectional view of a reduction gear apparatus according to the first embodiment.
Figure 8:
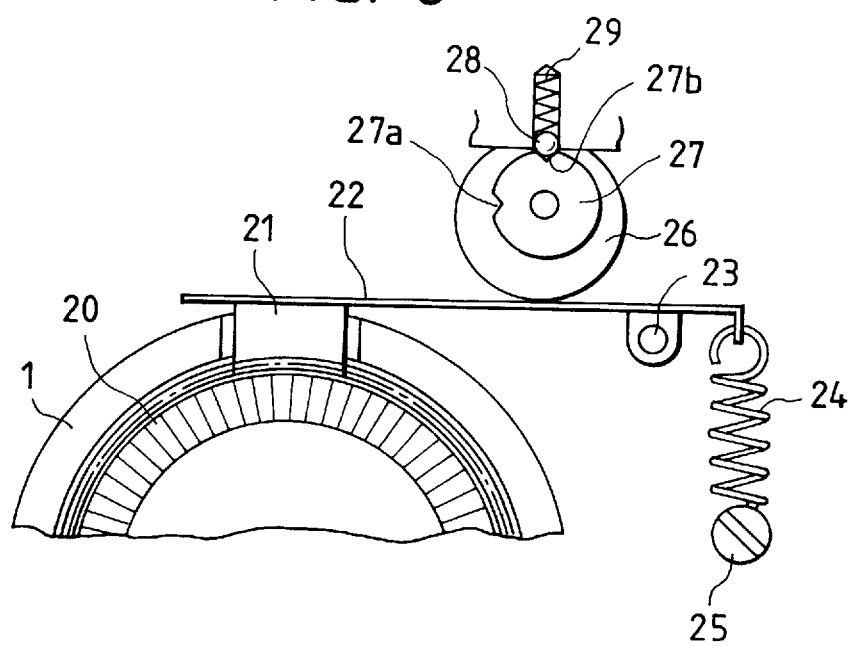
FIG. 8 is a sectional view showing the ON state of a clutch mechanism in the reduction gear apparatus in FIG. 7.
Figure 9:
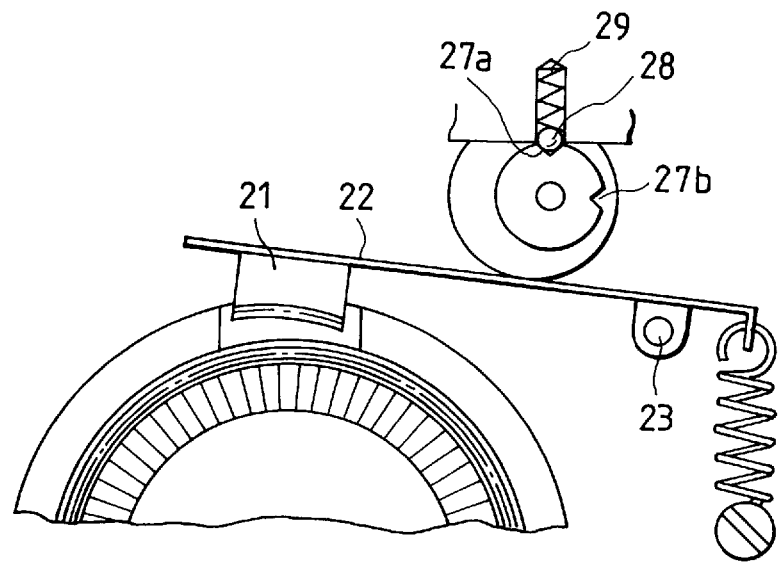
FIG. 9 is a sectional view showing the OFF state of the clutch mechanism in the reduction gear apparatus in FIG. 7.

FIG. 7 shows the first embodiment of the present invention, and FIGS. 8 and 9 show the operating states of the first embodiment.

This embodiment is basically the same as the reduction gear apparatus in FIG. 1, and only differences will be described below.

The first embodiment has a clutch mechanism for fixing a first gear (having the same function as that of the first gear 14) 20 or causing the first gear 20 to freely rotate with respect to a casing 1.

In the clutch mechanism of this embodiment, engaging teeth 21a formed to have almost the same tooth profile as that of clutch teeth 21 mesh with a gear portion 20a formed on the outer circumferential surface of the first gear 20 pivotally mounted in the casing 1, thereby fixing the first gear 20 to the casing 1. When the above meshing is released, the first gear 20 is set free to rotate with respect to the casing 1.

The clutch teeth 21 are fixed to the distal end portion of a pivot lever 22 having spring properties and pivotal about, as a fulcrum, a pin 23 mounted on a fixing member such as the casing 1. When the pivot lever 22 is pivoted counterclockwise, as shown in FIG. 8, the clutch teeth 21 mesh with the engaging teeth 20a of the first gear 20, thereby fixing the first gear 20 with respect to the casing 1. As shown in FIG. 9, when the pivot lever 22 is pivoted clockwise, the clutch teeth 21 disengage from the engaging teeth 20a of the first gear 20, so that the first gear 20 is free to rotate.

The pivot lever 22 always receives a clockwise pivot force by the spring force of a spring 24 hooked between a pin 25 extending on the casing 1 and the other end of the pivot lever 22. When the counterclockwise press force acting on the pivot lever 22 is released, the pivot lever 22 is pivoted clockwise to unlock the first gear 20 from the casing 1.

The press force is applied/removed to/from the pivot lever 22 by rotation of an eccentric cam 26. The eccentric cam 26 has a locking cam surface brought into contact with the pivot lever 22 to pivot the pivot level 22 counterclockwisely, thereby engaging the clutch teeth 21 with the engaging teeth 20a of the first gear 20, and an unlocking cam surface for releasing the above engagement during one rotation. A click disk 27 is disposed coaxially with the eccentric cam 26. The position where a click ball 28 pressed by a click spring 29 is fitted in a first click hole 27a formed at the peripheral edge of the click disk 27 is an unlocking position shown in FIG. 9. The position where the click ball 28 is fitted in a second click hole 27b formed at another peripheral edge of the click disk 27 is the locking position shown in FIG. 8.

The eccentric cam 26 is pivoted by turning a clutch selection knob (not shown) and is held at the unlocking or locking position where the click ball 28 is fitted in the first or second click hole 27a or 27b.

(Second Embodiment)

Figure 10:
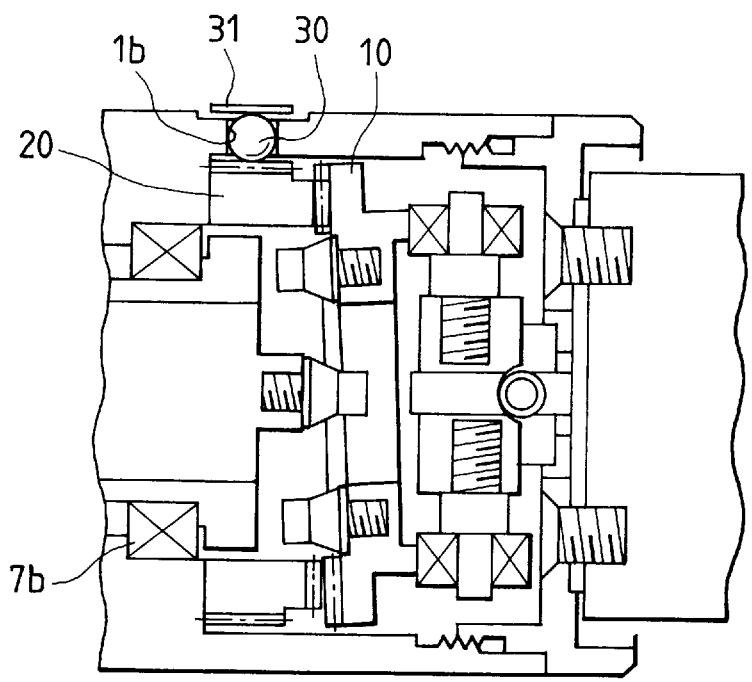
FIG. 10 is a sectional view of a reduction gear apparatus according to the second embodiment.
Figure 11:
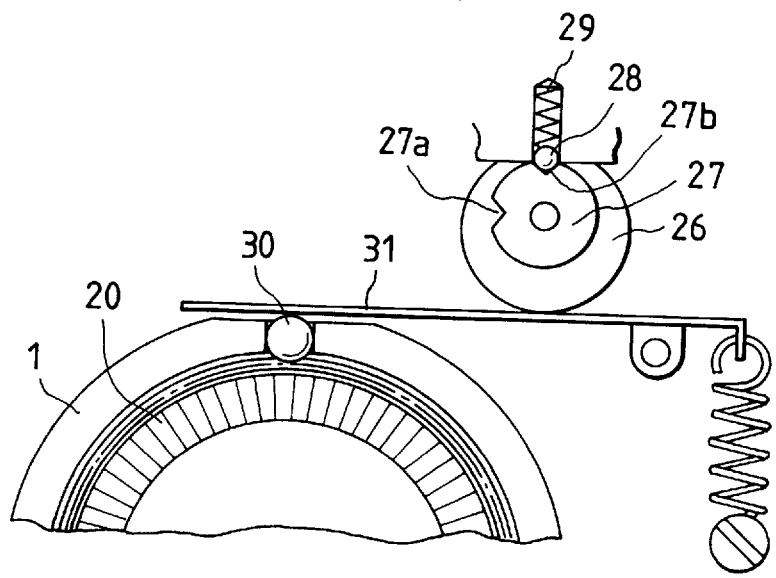
FIG. 11 is a sectional view showing the ON state of a clutch mechanism of the reduction gear apparatus in FIG. 10.
Figure 12:
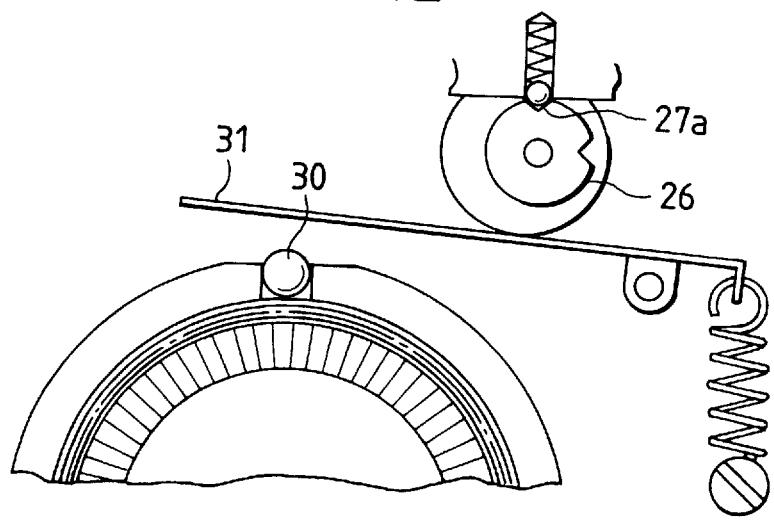
FIG. 12 is a sectional view showing the OFF state of the clutch mechanism of the reduction gear apparatus in FIG. 10.

FIG. 10 shows the second embodiment, and FIGS. 11 and 12 show the operating states of the second embodiment. The basic structure of this embodiment is identical to that of the reduction gear apparatus in FIG. 1, and only differences will be described below.

In this embodiment, a ball member 30 fitted in a window 1b formed in part of the wall surface of a casing 1 engages with a gear portion 20a of a first gear 20 to fix the first gear 20 with respect to the casing 1 in the same manner as in the first embodiment. The ball member 30 is pressed by a pivot lever 31 pressed and pivoted by an eccentric cam 26 as in the first embodiment.

In the unlocking state (FIG. 12) wherein the ball member 30 is fixed with respect to the pivot lever 31, when the pivot lever 31 is pivoted to the unlocking position, the ball member 30 is free to move in the window 1b. The press force does not act on the gear portion 20a of the first gear 20. Therefore, the first gear 20 is free to rotate with respect to the casing 1.

In the first and second embodiments described above, when a rotation force is applied to an output shaft 6 while a motor 2 is kept stopped, a second gear 10 does not rotate in the case (FIGS. 8 and 11) wherein the first gear is fixed. However, in the rotatable state (FIGS. 9 and 12) wherein the first gear 20 is free to rotate with respect to the casing 1, only the first and second gears 20 and 10 rotate together. In this case, the press mechanism is kept in the non-rotation state, and a rotating shaft 2a of the motor does not rotate.

In the structure of this embodiment, when a rotation torque is applied to the first gear 20, the gear portion 20a of the first gear 20 generates a radially outward action force which acts on the fitted ball member 30. For this reason, when the action force exceeds the force acted on the ball member 30 by the pivot lever 31, a torque limiter function is effected in which the ball member 30 disengages from the first gear 20.

More specifically, when a large force acts on or from the load side, the second gear 10 cannot rotate because the load on the output shaft 6 connected integrally with the second gear 10 is large. The force acts to rotate the first gear 20. As a result, the first gear 20 pushes the ball member 30 upward and starts to rotate. At this time, the rotation torque, i.e., the maximum transmission torque of the torque limiter is determined by the tooth profile, the diameter of the ball member, and the spring constant of the pivot lever 31.

(Third Embodiment)

Figure 13:
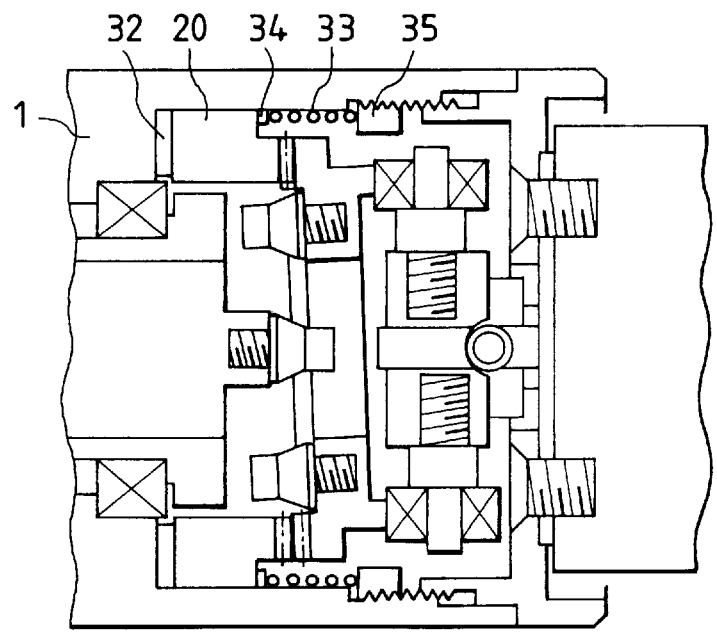
FIG. 13 is a sectional view of a reduction gear apparatus according to the third embodiment.

FIG. 13 shows the third embodiment.

This embodiment is related to a torque limiter mechanism for limiting rotation of a first gear 20 with respect to a casing 1 by using a friction plate and a friction spring. The basic structure is the same as that of the reduction gear apparatus shown in FIG. 1, and only differences will be described below.

In this embodiment, the first gear 20 abuts on a friction plate 32 fixed to the casing 1 and is accommodated in the casing 1. The first gear 20 is pressed by a friction spring 33 guided by a spring guide 34. The other end of the friction spring 33 abuts against a spring holder 35, and a predetermined spring force acts between the first gear 20 and the friction plate 32.

When the output shaft side is set in a high load state, friction is generated between the friction plate 32 and the first gear 20. When a motor 2 starts to rotate against this friction, the first gear 20 starts to rotate.

The maximum transmission torque of this embodiment is determined by the friction coefficients of the first gear 20 and the friction plate 32, and the press force of the friction spring 33.

(Fourth Embodiment)

Figure 14:
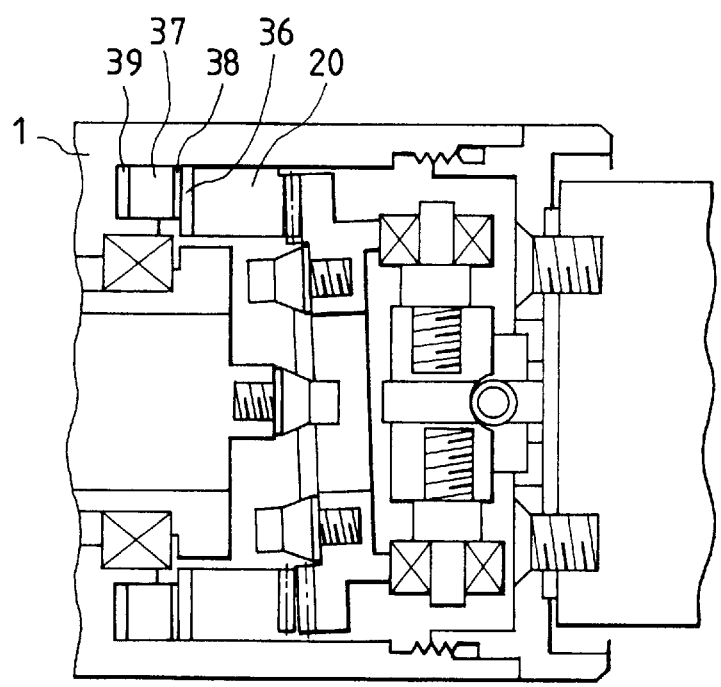
FIG. 14 is a sectional view of a reduction gear apparatus according to the fourth embodiment.

FIG. 14 shows the fourth embodiment.

This embodiment constitutes a torque limiter mechanism for a reduction gear apparatus by using a magnetic field generation means. The basic structure of the reduction gear apparatus is the same as that of the reduction gear apparatus shown in FIG. 1, and only differences will be described below.

In this embodiment, a magnetic member 36 is fixed to one side of a first gear 20 using screws, an adhesive, or the like. This magnetic member 36 is made of a thin Fe—Cr—Co— system semirigid magnetic plate (thickness: about 1.5 mm). A resin magnet 37 is mounted in a casing 1 and consists of a ferrite-based magnetic member and a thin nylon-based plate (thickness: about 1.5 mm). A spacer 38 is a nylon-based member and adhered to the resin magnet 37 so as to oppose the magnetic member 36. The spacer 38 keeps the gap between the magnetic member 36 and the resin magnet 36 constant and serves to generate friction torque upon sliding. The spacer 38 defines the hysteresis torque by its thickness. The thickness of the spacer 38 is, e.g., about 0.1 mm.

A yoke plate 39 is made of a thin SECC-C20 (plated steel plate; tradename: Zin Coat) plate (thickness: about 0.5 mm) and is mounted on the resin magnet 37 to form a magnetic circuit. The yoke plate 39 is fixed to the casing 1 together with the resin magnet 37 by screws or an adhesive.

The slip torque of the torque limiter mechanism of this embodiment is determined by the hysteresis torque and the friction torque. The hysteresis torque, in turn, is determined by adjusting the number of poles, the magnetization strength, and the gap of the resin magnet 37. In this embodiment, a friction torque is generated between the magnetic member 36 and the spacer 38, and the friction torque is added to the hysteresis torque to determine the slip torque. However, only the hysteresis torque may serve as the slip torque without using the spacer 38.

In this embodiment, as the magnetic field generation means for generating the hysteresis torque, the resin magnet 37 is fixed in the casing 1. However, the resin magnet 37 and the yoke plate 39 may be arranged on the first gear 20 side, while the magnetic member may be disposed at the casing side. Alternatively, a friction adjustment agent such as grease may be applied to the sliding portion.

The above slip torque serves as the maximum transmission torque of the output shaft.

(Fifth Embodiment)

Figure 15:
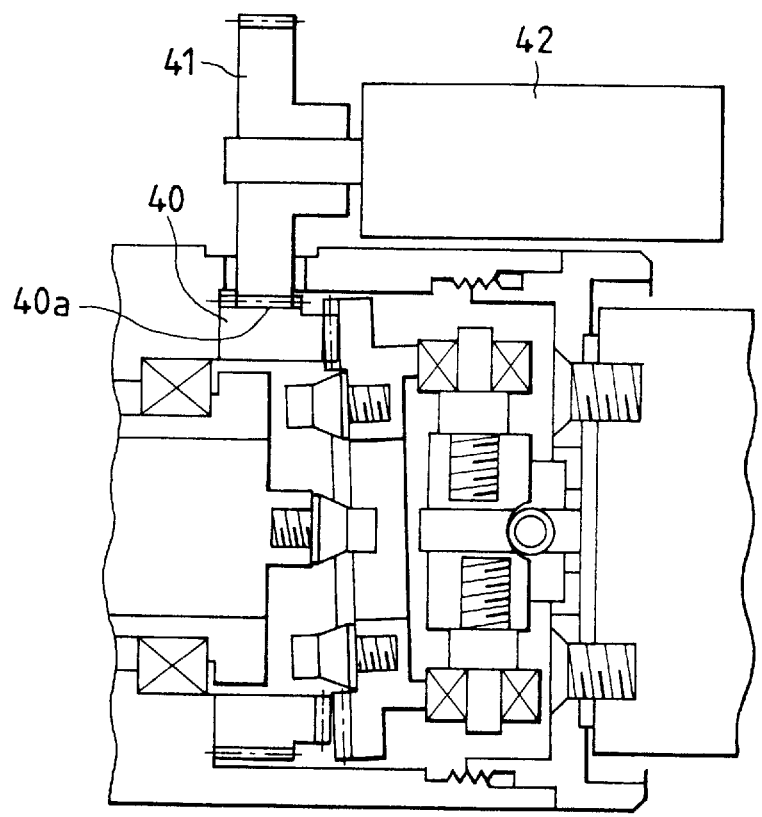
FIG. 15 is a sectional view of a reduction gear apparatus according to the fifth embodiment.

FIG. 15 shows the fifth embodiment.

In this embodiment, a first gear 40 rotatably mounted in a casing 1 is rotated by a motor 42 serving as an external rotation source, thereby further increasing the speed reducing ratio.

A motor gear 41 is fixed to the motor shaft of the motor 42 arranged in or outside the casing 1, and a motor gear 41 meshes with a gear portion 40a formed on the outer circumferential portion of the first gear 40.

When the motor gear 41 meshes with the gear portion 40a, the first gear 40 is decelerated to rotate in the swinging and rotation direction of a second gear 10.

While the first gear 40 is at rest, the difference between the number of teeth of the first gear 40 and the number of teeth of the second gear 10 becomes the speed reducing ratio, and the rotation becomes an output, as described above. As can be apparent from the principle of operation in a differential gear, when the first gear 40 rotates, a speed difference of the first gear 40 from the speed of the second gear 10 serves as the rotation output of the output shaft 6.

A higher speed reducing ratio can be obtained.

(Sixth Embodiment)

Figure 16:
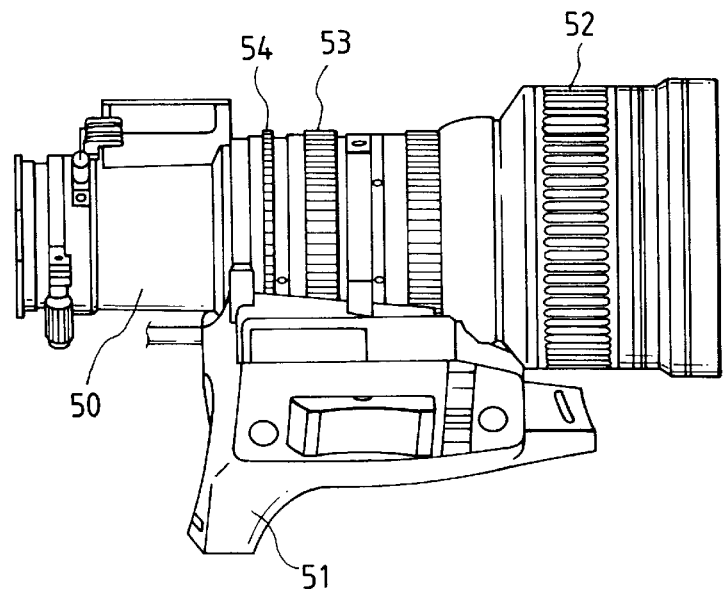
FIG. 16 is a side view of a photographic lens according to the sixth embodiment.

FIG. 16 shows the sixth embodiment.

Figure 17:
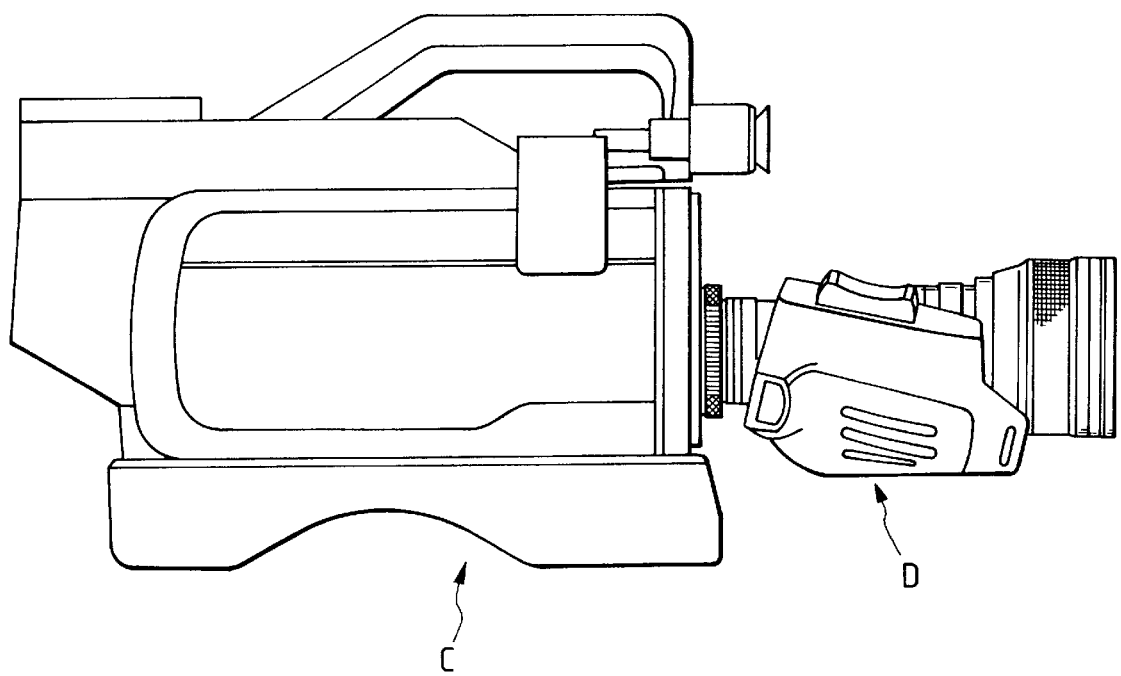
FIG. 17 is a side view of a television camera on which the photographic lens in FIG. 16 is mounted.

In this embodiment, a reduction gear apparatus shown in each embodiment of the present invention is applied to a drive mechanism for lens driving such as focusing and zooming of a photographic lens serving as an optical system, or iris driving. A photographic lens D mounted on a television camera C shown in FIG. 17 is shown in FIG. 16.

The arrangement of this embodiment includes a lens body 50, a drive unit 51, a focus ring 52, a zoom ring 53, and an iris ring 54 in FIG. 16. The output gear of a drive apparatus (not shown) meshes with the gear portions formed on the outer circumferential surfaces of these rings to transmit a rotation output.

Figure 18:
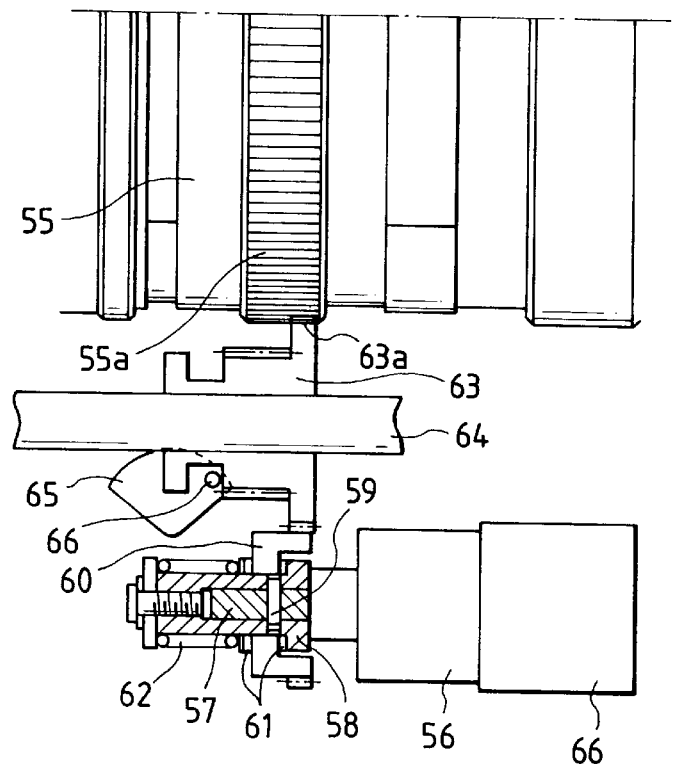
FIG. 18 is a sectional view of a conventional drive apparatus, showing the clutch ON state.
Figure 19:
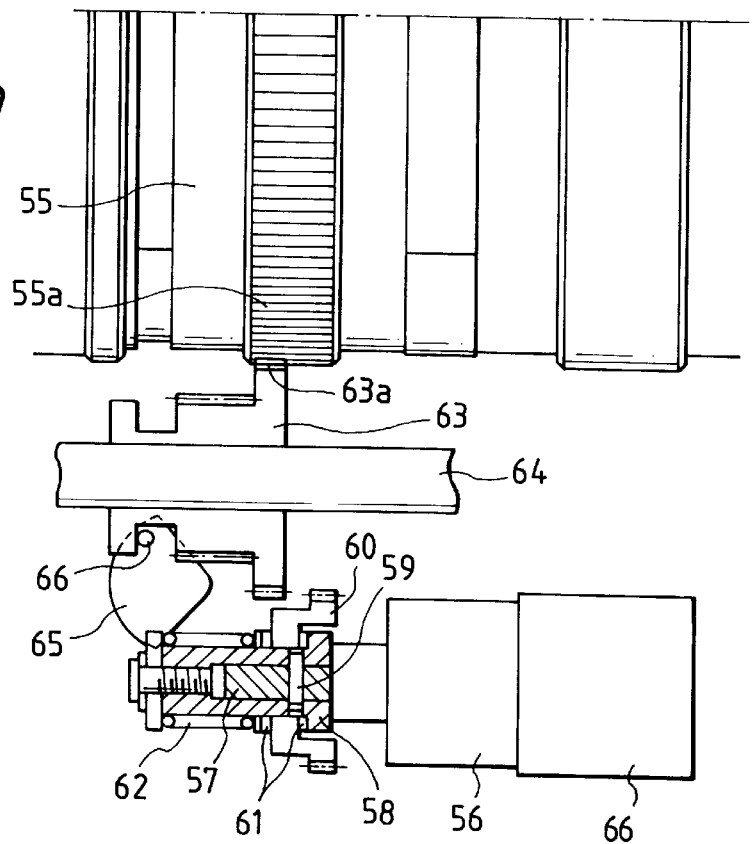
FIG. 19 is a sectional view showing the clutch OFF state.

The output from the reduction gear apparatus can be transmitted to a destination member through a transmission mechanism shown in FIGS. 18 and 19. Referring to FIGS. 18 and 19, torque limiter members such as a sleeve 58 and a spring 62 can be omitted, and the output from the reduction gear apparatus can be directly connected to an output shaft 6.

The focus ring, the zoom ring, the iris ring, or the like may be directly driven by a gear mounted on the output shaft 6.

In this embodiment, the reduction gear apparatus of the present invention is used to obtain a backlash-free rotation output. In addition, the sound shielding and antivibration effects against sounds and vibrations can also be obtained. The response characteristics upon operating the focus, zoom, or iris ring can be improved. A smooth movement free from fluctuations can be obtained at the initial operation of the focus, zoom, or iris ring.

In each embodiment, first and second gears are used as reduction gear differential members. However, a friction disk may be used as a reduction gear differential member, and an abutment position shift in frictional rotation may be output as a reduction gear output.

According to the present invention, the relative difference in abutment or meshing position between the first and second members is output. When rotation of the first member is controlled, there can be provided a clutch mechanism function for connecting/disconnecting power transmission to/from the output shaft, and a torque limiter function of maintaining non-rotation until a predetermined torque is applied. When the first member is rotated, the speed reducing ratio can be changed.

For this reason, the reduction gear apparatus itself can have a clutch mechanism, a torque limiter mechanism, and a reduction gear mechanism. As in the invention of claim 18, when the output from the reduction gear apparatus is to be transmitted to a target member, the transmission system need not have these mechanisms, thereby downsizing and simplifying the transmission system and hence downsizing an equipment using this transmission system.

In addition, the number of components can be reduced, assembly can be facilitated, and products can be manufactured at low cost.

According to the present invention, a clutch mechanism can be incorporated in the reduction gear apparatus.

According to the present invention, a torque limiter mechanism can be incorporated in the reduction gear apparatus.

According to the present invention, the speed reducing ratio can be changed by rotation of the first member.

According to the present invention, the first and second members of the reduction gear apparatus having the above effects can be constituted by gears, thereby preventing backlash.

According to the present invention, when the present invention is applied to an optical system such as a photographic lens or a camera, the photographic lens and the camera are downsized. In addition, the number of components can be reduced, assembly can be reduced, and products can be manufactured at low cost. In addition, optical means such as a focusing lens, a zooming lens, or an iris can be driven with high precision.

A backlash-free rotation output can be obtained, and a sound shielding and antivibration effects against sounds and vibrations can also be obtained. The response characteristics upon operating the focus, zoom, or iris ring can be improved. A smooth movement free from fluctuations can be obtained at the initial operation of the focus, zoom, or iris ring.

What is claimed is:

1. A reduction gear apparatus comprising:
    a first member;
    a second member connected to an output shaft;
    a press member rotating together with an input shaft to press part of said second member so as to bring said part into contact with said first member; and
    a torque limiter mechanism for rotating said first member about an axis of said output shaft when a predetermined torque is loaded on said output shaft.

2. An apparatus according to claim 1, wherein said first and second members have teeth whose numbers are different from each other, and said teeth of said first and second members partially mesh via said press member.

3. An apparatus according to claim 1, wherein said apparatus has a housing for accommodating said first member, said second member, and said press member, with said torque limiter mechanism including a magnetic field generator to attract said first member to said housing.

4. An apparatus according to claim 1, further comprising a housing for containing said first member, said second and said pressing member,
    wherein said torque limiter mechanism has a biasing member for biasing said first member into said housing.

5. An apparatus according to claim 1, wherein said first member has a plurality of concave portions at a periphery portion thereof, and
    said torque limiter mechanism has a ball contained in at least a concave portion in said first member and a biasing member for biasing said ball in a direction toward said concave portion.

6. An apparatus according to claim 1, wherein said first member has a plurality of gears at a periphery portion thereof, and
    said torque limiter mechanism has a gear portion for meshing with a gear of said first member and a biasing member for biasing said gear portion in a direction of said gear of said first member.

* * * * *

UNITED STATES PATENT AND TRADEMARK OFFICE
CERTIFICATE OF CORRECTION

PATENT NO. : 5,860,887

DATED : January 19, 1999

INVENTOR(S) : Yamamoto

It is certified that error appears in the above-identified patent and that said Letters Patent is hereby corrected as shown below:

COLUMN 6:

Line 21, "toque" should read --torque--.

COLUMN 8:

Line 20, "level" should read --lever--.

Signed and Sealed this

Twenty-fourth Day of August, 1999

Attest:

Q. TODD DICKINSON

Attesting Officer

Acting Commissioner of Patents and Trademarks